United States Patent [19]

Ruf et al.

[11] Patent Number: 4,643,138

[45] Date of Patent: Feb. 17, 1987

[54] SUCTION PIPE SYSTEM FOR MULTICYLINDER INTERNAL COMBUSTION ENGINE

[75] Inventors: Max Ruf, Obereissheim; Erwin Korostenski, Oedheim; Johannes Steinwart, Obersulm-Willebach, all of Fed. Rep. of Germany

[73] Assignee: Audi AG, Fed. Rep. of Germany

[21] Appl. No.: 785,964

[22] Filed: Oct. 10, 1985

[30] Foreign Application Priority Data

Oct. 10, 1984 [DE] Fed. Rep. of Germany ....... 3437102

[51] Int. Cl.$^4$ ............................................. F02B 75/22
[52] U.S. Cl. ............................ 123/52 M; 123/52 MV
[58] Field of Search ...................... 123/52 M, 52 MV

[56] References Cited

U.S. PATENT DOCUMENTS

| 2,845,911 | 8/1958 | Gill | 123/52 MV |
|---|---|---|---|
| 3,303,832 | 2/1967 | Platner et al. | 123/52 M |
| 4,425,881 | 1/1984 | Lyndhurst | 123/52 MV |
| 4,440,120 | 4/1984 | Butler | 123/52 MV |

FOREIGN PATENT DOCUMENTS

| 253305 | 4/1967 | Austria | 123/52 MV |
|---|---|---|---|
| 1442247 | 7/1976 | United Kingdom | 123/52 MV |

Primary Examiner—Craig R. Feinberg
Attorney, Agent, or Firm—Kane, Dalsimer, Kane, Sullivan and Kurucz

[57] ABSTRACT

In a suction pipe installation for multicylinder internal combustion engine with a collector suction pipe, a suction distributor is connected therewith. Adjacently disposed individual suction pipes form a unitary unit with the collector suction pipe. The individual suction pipes extend from the flanges a curve of more than 90° to connecting flanges. The collector suction pipe 1 is mounted in the chamber enclosed by the individual suction pipes, so that it does not require any additional space. A quiet airflow is formed in the straight line segment of the collection suction pipe 1, and in which an air amount meter 18 for a fuel injection installation is installed.

4 Claims, 5 Drawing Figures

SUCTION PIPE SYSTEM FOR MULTICYLINDER INTERNAL COMBUSTION ENGINE

BACKGROUND OF THE INVENTION

The present invention relates to a suction pipe system for multicylinder internal combustion engines, with a collector suction pipe, a suction distributor connected therewith and adjacent disposed individual suction pipes which extend from the suction distributor and lead to the individual cylinders.

In a known suction pipe system of this type (DE-OS No. 29 30 697) the collector suction pipe is U-shaped and vertically disposed. With one shank it is connected with the air filter, while with its other shank it is connected with the center of a further U-shaped horizontally diposed suction distributor. Thus, the individual suction pipes extend from the shanks of this suction distributor. This known suction pipe system requires a relatively large space because of the U-shaped design of the collector suction pipe, as well as the suction distributor. Accordingly this suction pipe system is only available in large volume internal combustion engines with V-shaped designed rows of cylinders.

SUMMARY OF THE INVENTION

It is an object of the invention to provide a suction pipe system of the aforementioned type which requires a relatively small space, but which still permits relatively large suction pipe lengths.

This and other objects and advantages are attained by individual suction pipes extending in a curve of more than 90°, preferably more than 150°, to provide a large length of individual suction pipes with small space requirement. By mounting the collector suction pipe in the space which is partially enclosed by the individual suction pipes, no additional space is required for the collector suction pipe. Since the flanged suction distributor extends over the total length of the unit which consists of the individual suction pipes and the collector suction pipe, a very large total suction pipe length is provided. This length comprises the length of the collector suction pipe, the length of the suction distributor and the length of the individual suction pipes.

Inasmuch as the suction pipe system includes a collector suction pipe extending in a straight line over a relative long path, a quiet interference free air flow is obtained. Thus, there is possibility to provide an air quantity meter requiring such air flow for a fuel injection system in the collector suction pipe. Such an air quantity meter may be a hot wire air metering device or a flow metering device, or for example, of the Karmann vortex type. Hitherto, such metering devices had to be installed in a separate straight lined pipe which enlarged the space requirement of the suction pipe system considerably.

An opening which discharges into the suction collector pipe may be provided between two adjacent individual suction pipes for assembling the air quantity meter.

The suction pipe system in accordance with the invention is particularly suitable for an internal combustion engine with V-shaped disposed rows of cylinders. In this arrangement, a flange is provided on each side of the longitudinal center plane of the unit. The individual suction pipes, which are associated with a first cylinder group, extend from the one flange and the individual suction pipes, which are associated with the second row of cylinders, extend from the other flange. The individual suction pipes of the one group extend around the collector suction pipe in a clockwise direction and the individual suction pipes of the other group extend in the counterclockwise direction. In the longitudinal direction of the unit one given individual suction pipe of the one group follows an individual suction pipe of the other group. The collector suction pipe is enclosed by the individual suction pipes by about 300° in this embodiment. Thus, a symmetric structure with uniformly long individual suction pipes is obtained. In order to prevent countercurrents in the collector suction pipe and in the suction distributor, caused by overlapping suction operations, the suction distributor can be separated into two chambers by means of an axially extending separating wall.

The long individual suction pipes result in a high torque during full load and low speeds. However, with high speeds and full loads the power is reduced due to the flow resistancy. In order to overcome this, a second shorter individual suction pipe may be provided in addition to each individual suction pipe. In this manner, the second shorter individual pipe discharges into the first suction pipe as close as possible to the connecting flange of the cylinder head. These first suction pipes are closed with a closing means during low speeds, but at a defined speed, for example, 3,500 rotations per minute; and they can either be completely opened or continuous with increasing speed. The closing means which are associated with the second suction pipes are commonly actuated. This can be obtained in a simple manner in that the closing means are formed by rotary slide valves; and, that the rotary slide valve which is associated with the first row of cylinders is mounted on a first common shaft and the rotary slide valve which is associated with the second row of cylinders is mounted on a second common shaft. These two shafts are coupled with each other and are driven together, for example, by means of pneumatic or hydraulic cylinder or by an electro motor. These are switched on at a defined speed and moves the rotary slide valves either into a completley open position or opens them continuously according to the increase of speed. The return of the rotary slides into their closing position may be performed by spring force or by polarity reversal of the electromotor.

BRIEF DESCRIPTION OF THE DRAWINGS

Two exemplified embodiments of the invention are described in the following in conjunction with the drawings. The drawings show.

DETAILED DESCRIPTION OF THE PREFERRED EMBODIMENT

Figure 1:
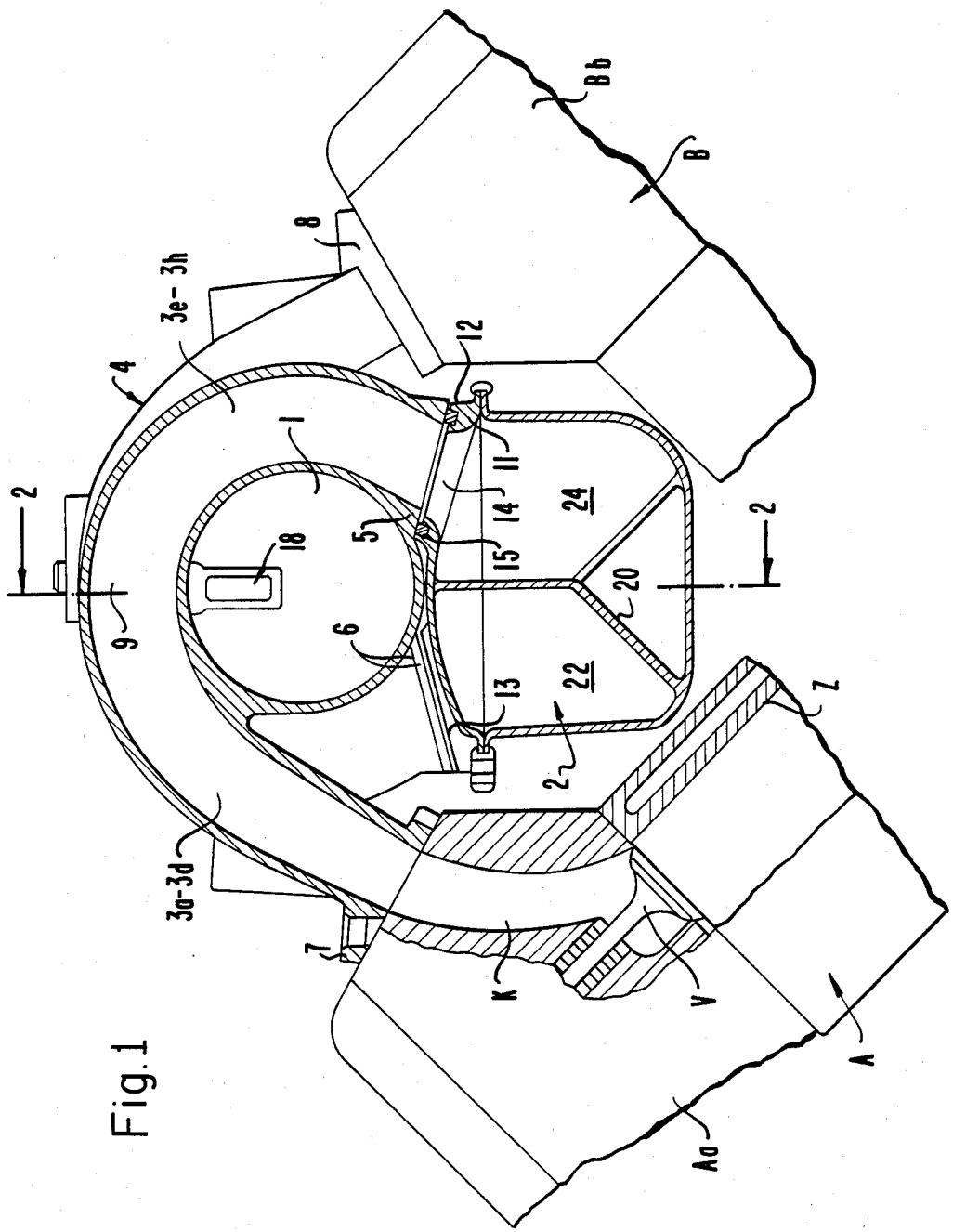
FIG. 1 is a cross-section of the suction pipe system for a V8-internal combustion engine.
Figure 2:
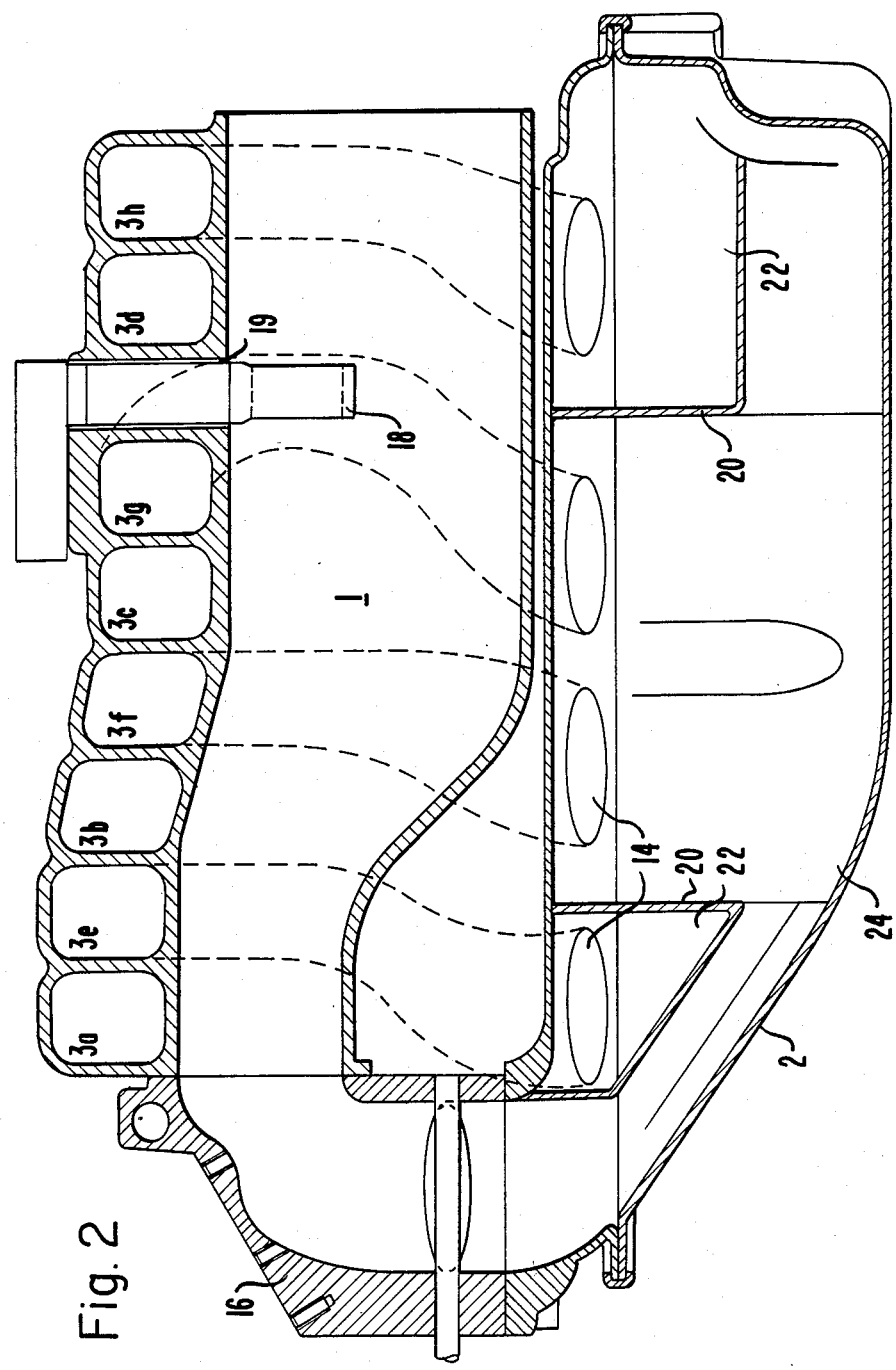
FIG. 2 is a longitudinal section along line 2—2 in FIG. 1.

The suction pipe system illustrated in FIG. 1 and 2 is particularly adapted for a V8 internal combustion engine which has two parllel rows of cylinders A and B with cylinders Z and cylinder heads Aa and Bb. An inlet conduit K is provided in the cylinder heads for each cylinder controlled by an inlet valve V. The suction pipe system is provided with a collector suction pipe 1, a downstream coupled suction distributor 2 and adjacently disposed suction pipe 3a–3d and 3e–3h which lead to the individual cylinders of the internal combustion engine. The individual suction pipes 3a–3d supply the respective cylinder of the one row of cylinders and the individual suction pipes 3e–3h supply the respective cylinders of the other row of cylinders. The collector suction pipe 1 and the individual suction pipes 3a–3h are combined into a single unit 4 which is provided at each side of its longitudinal center plane 9 with flanges 5 or 6, respectively.

The individual suction pipes 3a–3h extend in a curve of about 150° from their respective flanges 5 and 6 to connecting flanges 7 and 8, respectively, with which the unit is screwed onto the cylinder heads of the two rows of cylinders. Therefore, the collector suction pipe 1 extends practically through the chamber which is enclosed by the individual pipes, and, consequently, does not require further space.

As can be seen from FIG. 2, the individual suction pipes 3a–3h are disposed adjacent to each other, in such a manner that one individual suction pipe for one cylinder of the one row of cylinders is always followed by one individual suction pipe of the other row of cylinders.

An intermediary flange 11 is provided in the exemplified embodiment between the unit 4 and the suction distributor 2 which is flanged and screwed to the housing of the internal combustion engine by means of this flange. This flange 11 is provided with planar faces 12, 13 on which the unit 4 with associated flanges 5, 6 supported and which is provided with an opening 14 for each individual suction pipe 3a–3h. Each opening 14 is surrounded with a packing ring 15 and the unit 4 is pressed against the packings 15 during the screwing of the flanges 7, 8 onto the cylinder heads. Principally, the intermediary flange 11 may be formed integrally with unit 4.

The suction distributor 2 extends over the total length of unit 4 and is closed at its right end as viewed in FIG. 2, and is connected with the collector suction pipe 1 by means of a throttle valve 16 with its left end. A throttle valve flap 16a is provided in the throttle valve part 16 for each row of cylinders.

As can be seen from FIG. 2, the collector suction pipe 1 forms a smooth cylindrical air guide, at least in the right section, so that a quiet airflow can be obtained therein. Therefore, it is possible to install an air amount metering device 18 at this location for the fuel injection system, a quiet flow being essential for correct metering. This is the case, for example, in hot wire air quantity metering devices, hot foil-air quantity metering devices and the like. As a result of the installation of this air quantity metering device 18 in unit 10, an otherwise required additional pipe socket for receiving the air quantity metering device is advantageously avoided, normally this additional pipe socket would usually be connected to the suction pipe and would require additional space. In order to assemble the air quantity metering device 18, an opening 19 is provided in the wall of unit 10 between two adjacent individual suction pipes discharging into the collector suction pipe 1.

Figure 3:
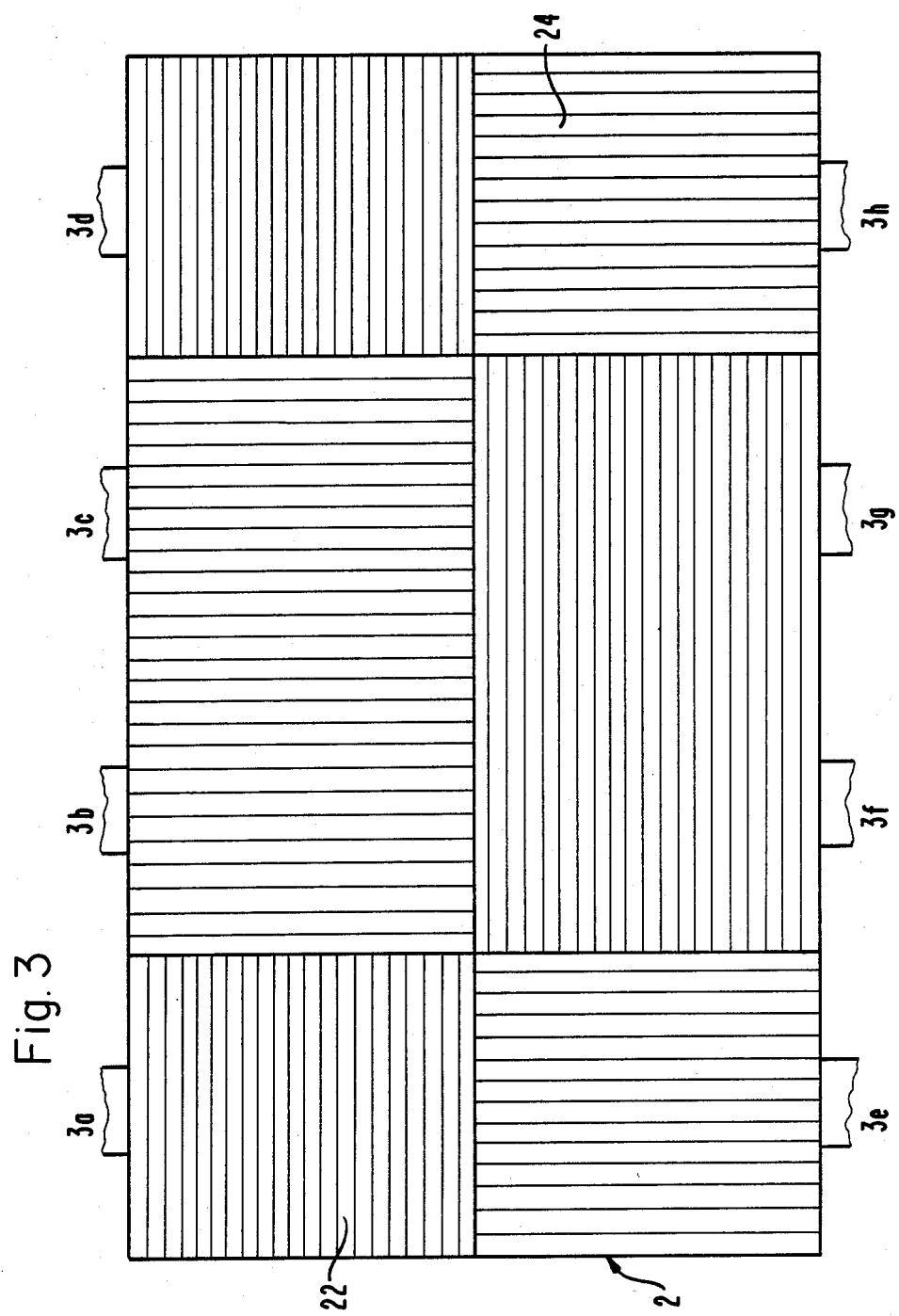
FIG. 3 is a schematic illustration of the suction distributor.

In the illustrated and described arrangement, all of the individual suction pipes 3a–3h have the same shape and length. However, since the suction operation is not performed in successive cylinders, but in V8-internal combustion engines, it may operate, for example, in the sequence of cylinders 1-5-4-8-6-3-7-2. It is also advantageous to separate the inner chamber of the suction distributor 2 into two partial chambers 22,24 by means of a separating wall 20 such that one throttle valve 16 is associated with each chamber and that the cylinders are connected therewith at a uniform ignition distance. This means that the individual suction pipes 3a, 3d, 3f and 3g are connected with the one partial chamber 22 and the individual suction pipes 3b, 3c, 3e and 3h are connected with the other partial chamber 24. FIG. 3 schematically illustrates this separation of the suction distributor, the partial chamber 22 denoted by horizontal lines and the partial chamber 24 by vertical lines.

Figure 4:
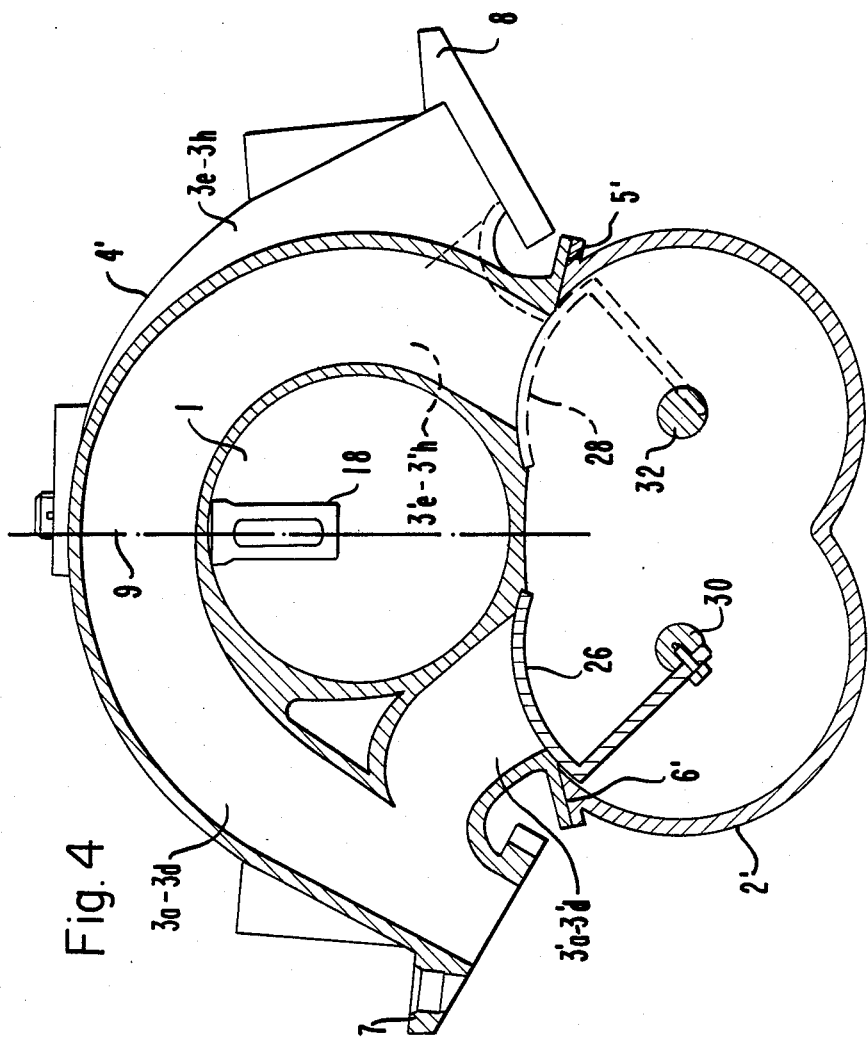
FIG. 4 is a cross-section similar to FIG. 2 of one embodiment, wherein for each cylinder first and second individual suction pipes are provided.
Figure 5:
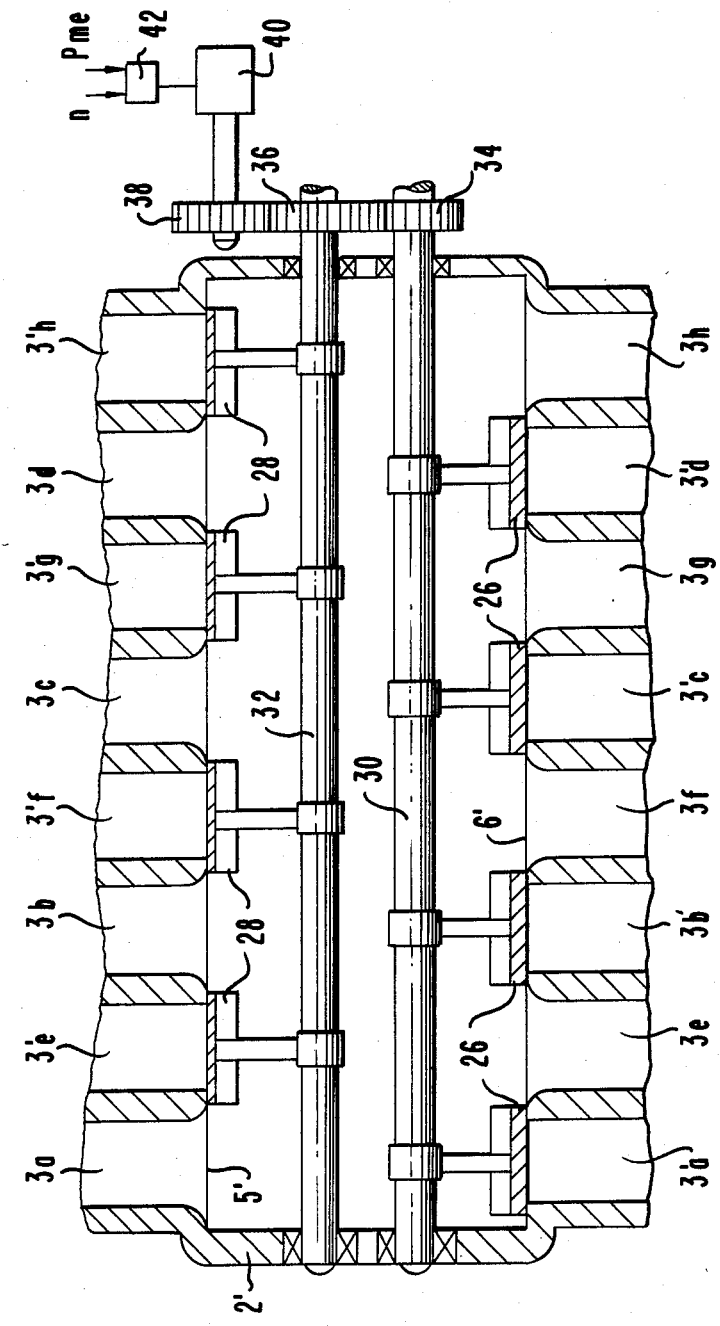
FIG. 5 is a schematic illustration of the embodiment in accordance with FIG. 4, illustrating the arrangement of the first and second suction pipes, the rotary slide valves for the second individual suction pipes and the drive for the same.

The embodiment in accordance with FIGS. 4 and 5 differs from the first exemplified embodiment essentially only in the use of second shorter individual suction pipes 3a' to 3h' in addition to each individual suction pipe 3a to 3h'. While the (first) individual suction pipes 3a to 3d extend from the first flange 5', as in the first example, the second individual suction pipes 3a' to 3d' extend from the second flange 6' and discharge into the first individual suction pipe 3a to 3d in the proximity of the connecting flange 7. In a corresponding manner, the second individual suction pipes 3d' to 3h' associated with the (first) individual suction pipes 3d to 3h extend from the first flange 5, while these first individual suction pipes 3e to 3h extend from the second flange 6. This is illustrated in the schematic illustration of FIG. 5. The orifice of each of the second individual suction pipes 3a' to 3h' is controlled by a rotary slide valve. The rotary valves which are associated with the second individual suction pipes 3a' to 3d' extending from the second flange 6 are designated with numeral 26, and the rotary slide valves which are associated with the second individual pipes 3e' to 3h extending from the first flange 5 are designated with numeral 28. The rotary slide valves 26 are mounted on a first common shaft 30 and the rotary slide valves 28 are mounted on a second common shaft 32. The shafts 30 and 32 extend longitudinally along unit 4' and are supported in the wall of the suction distributor 2'. For clarity, the separating walls in the suction distributor are omitted. The shafts 30 and 32 are connected in a torsion resistant manner with each other by gears 34 and 36. A drive pinion 38 engages gear 36 driven by a pneumatic or hydraulic motor or an electro-motor 40, so as to rotate both shafts 30 and 32 and thereby pivot all rotary slide valves 26 and 28 together. In the position illustrated in FIGS. 4 and 5, the rotary slide valves 26,28 close the associated second individual suction pipes 3a' to 3h, so that only the first individual suction pipes 3a to 3h are active, as is the case in the first exemplified embodiment. Thus, a high torque is achieved during full load and low speed. However, during full load and high speed, the first individual suction pipes form a considerable flow resistance, due to their lengths, so that the highest output is reduced. Therefore, at a defined engine speed, for example, at 3,500 revolutions per minuted, the rotary slide valves 26 and 28 are opened, so that the suction air flow reaches the individual cylinders mainly through the short second individual suction pipes 3a' to 3h'. Thus, the highest output is considerably increased during full load.

The motor 40 which pivots the rotary slide valves 26, 28 can be controlled by a control unit 42 in which a performance graph may be stored with the speed and the load (mean pressure) of the internal combustion engine used as a parameter to determine the opening and closing of the rotary slide valve 26,28. Thus, during each speed and load, the most favorable flow ratios are obtainable for the suction air as, for example, in the area of the injection nozzles. Accordingly, a partial as well as well as full opening positions of the rotary slide valves are made possible. In such a performance graph control, the motor 40 is preferably an electromotor, which can be pole changeable, so as to perform the opening as well as the closing movements of the rotary slide valves. However, a double acting pneumatic or hydraulic; motor may also be used, which can affect the opening or closing movement depending on how it is biased admitted. Alternatively, the rotary slide valves may be biased by a spring (not shown) in the closed direction, so that the motor 40 merely causes the valve to open and the rotary slide valves are brought into a closed position by the spring after the motor had been shut off.

The invention is not only applicable to the illustrated exemplified embodiments, but is also useable in multi-cylinder internal combustion engines having only one row of cylinders. In this case only one flange 5 or 6 is provided from which the individual suction pipes extend.

Thus, the several aforenoted objects and advantages are most effectively attained, also several somewhat preferred embodiments have been disclosed and described in detail herein, it should be understood that this invention is no sense limited thereby and its scope is to be determined by that of the appended claims.

What is claimed is:

1. An intake system for a multicylinder internal combustion engine having first and second angularly disposed banks of cylinders with a certain firing order, comprising:
   (a) a monolithically formed intake manifold which extends longitudinally between said banks and has a longitudinal center plane, said manifold comprising
   a central, essentially straight tubular cavity extending the whole length of said manifold and having an inlet end and an outlet end on respective spaced ends of the cavity;
   first and second flanges extending in parallel to said tubular cavity and arranged on either side of said longitudinal center plane, and
   first and second individual suction pipes leading to the cylinders of the first and second cylinder bank, respectively, the first suction pipes extending from one end from the first flange adjacent to the second cylinder bank in a clockwise direction around said tubular cavity crossing said longitudinal center plane, and the second suction pipes extending from one end from the second flange adjacent to the first cylinder bank in an anticlockwise direction around said tubular cavity crossing said longitudinal center, wherein the first and second suction pipes are arranged side-by-side longitudinally of the intake manifold with a first pipe alternating with a second pipe,
   (b) a plenum chamber mounted by an intermediate flange on flanges formed on opposite ends of said first and second individual suction pipes extending in parallel to said tubular cavity and arranged on either side of said longitudinal center plane and having an internal cavity divided by a separation wall into two compartments, each compartment being in communication with an equal number of suction pipes of such cylinders of the first and second cylinder bank which follow each other in firing order and have a common ignition distance,
   (c) a part containing a throttle valve and connected to one end of said intake manifold and communicating the outlet end of said tubular cavity with the internal cavity of said plenum chamber, and
   (d) an air flow meter for a fuel injection system disposed in said central tubular cavity.

2. An intake system according to claim 1 wherein said intake manifold further comprises third and fourth suction pipes shorter in length than said first and second suction pipes, the third suction pipes extending from said second flange in alternating order with said second suction pipes and opening into said first suction pipes, and the fourth suction pipes extending from said first flange in alternating order with said first suction pipes and opening into said second suction pipes, and commonly actuable closing means are provided for the third and fourth suction pipes.

3. An intake system according to claim 2, wherein said closing means are formed by rotary valves, the rotary valves associated with the third suction pipes and the rotary valves associated with the third suction pipes each being mounted on a common shaft.

4. An intake system according to claim 2, and further comprising means for controlling said closing means in dependence on engine speed in such manner that they are closed in a lower speed range and opened in a higher speed range.

* * * * *